US011025902B2

(12) United States Patent
Zurpal et al.

(10) Patent No.: US 11,025,902 B2
(45) Date of Patent: *Jun. 1, 2021

(54) SYSTEMS AND METHODS FOR THE REUSE OF ENCODING INFORMATION IN ENCODING ALTERNATIVE STREAMS OF VIDEO DATA

(71) Applicant: NLD Holdings I, LLC, San Diego, CA (US)

(72) Inventors: Sergey Zurpal, Seversk (RU); Leonid Volnin, Saint-Petersberg (RU)

(73) Assignee: NLD Holdings I, LLC, San Deigo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,466

(22) Filed: Dec. 22, 2016

(65) Prior Publication Data
US 2017/0104989 A1 Apr. 13, 2017

Related U.S. Application Data

(63) Continuation of application No. 13/485,609, filed on May 31, 2012, now Pat. No. 9,532,080.

(51) Int. Cl.
*H04N 19/30* (2014.01)
*H04N 19/103* (2014.01)
(Continued)

(52) U.S. Cl.
CPC .......... *H04N 19/103* (2014.11); *H04N 19/30* (2014.11); *H04N 19/33* (2014.11); *H04N 19/39* (2014.11);
(Continued)

(58) Field of Classification Search
CPC ................................ H04N 7/32; H04N 19/30
See application file for complete search history.

(56) References Cited

U.S. PATENT DOCUMENTS 5,477,272 A 12/1995 Zhang et al.
5,592,226 A 1/1997 Lee et al.
(Continued)

FOREIGN PATENT DOCUMENTS

BR 1120140 29794 A2 6/2017
CN 1684518 A 10/2005
(Continued)

OTHER PUBLICATIONS

"Advanced video coding for generic audiovisual services", International Telecommunication Union ITU-T Recommendation H.264, Telecommunication Standardization Sector of ITU, Series H: Audiovisual and Multimedia Systems, May 7, 2004, pp. 13-26.
(Continued)

*Primary Examiner* — Dave Czekaj
*Assistant Examiner* — Berteau Joisil
(74) *Attorney, Agent, or Firm* — KPPB LLP

(57) ABSTRACT

Systems and methods for reusing encoding information in the encoding of alternative streams of video data in accordance with embodiments of the invention are disclosed. In one embodiment of the invention, encoding multimedia content for use in adaptive streaming systems, includes selecting a first encoding level from a plurality of encoding levels using a media server, determining encoding information for a first stream of video data using the first encoding level and the media server, encoding the first stream of video data using the media server, where the first stream of video data includes a first resolution and a first bitrate, selecting a second encoding level from the plurality of encoding levels using the media server, and encoding a second stream of video data using the encoding information and the media server, where the second stream of video data includes a second resolution and a second bitrate.

17 Claims, 6 Drawing Sheets

(51) Int. Cl.

| | | |
|---|---|---|
| *H04N 19/56* | (2014.01) | |
| *H04N 19/61* | (2014.01) | |
| *H04N 19/33* | (2014.01) | |
| *H04N 19/53* | (2014.01) | |
| *H04N 19/39* | (2014.01) | |
| *H04N 19/87* | (2014.01) | |
| *H04N 19/184* | (2014.01) | |

(52) U.S. Cl.
CPC ............. *H04N 19/53* (2014.11); *H04N 19/56* (2014.11); *H04N 19/61* (2014.11); *H04N 19/87* (2014.11); *H04N 19/184* (2014.11)

(56) References Cited

U.S. PATENT DOCUMENTS

| | | |
|---|---|---|
| 5,734,822 A | 3/1998 | Houha et al. |
| 5,794,061 A | 8/1998 | Moussouris |
| 5,822,524 A | 10/1998 | Chen et al. |
| 5,930,473 A | 7/1999 | Teng et al. |
| 6,075,884 A | 6/2000 | Lubin et al. |
| 6,118,817 A | 9/2000 | Wang |
| 6,192,154 B1 | 2/2001 | Rajagopalan et al. |
| 6,195,388 B1 | 2/2001 | Choi et al. |
| 6,229,850 B1 | 5/2001 | Linzer et al. |
| 6,233,359 B1 | 5/2001 | Ratnakar et al. |
| 6,330,369 B1 | 12/2001 | Hoag et al. |
| 6,343,098 B1 * | 1/2002 | Boyce .................. H04N 19/176 375/240.03 |
| 6,356,668 B1 | 3/2002 | Honsinger et al. |
| 6,563,517 B1 | 5/2003 | Rubas |
| 6,785,704 B1 | 8/2004 | McCanne |
| 6,859,496 B1 | 2/2005 | Boroczky et al. |
| 6,956,901 B2 | 10/2005 | Boroczky et al. |
| 6,970,602 B1 | 11/2005 | Li et al. |
| 6,976,151 B1 | 12/2005 | Overkamp et al. |
| 6,995,769 B2 | 2/2006 | Ordentlich |
| 7,224,890 B2 | 5/2007 | Kato |
| 7,330,509 B2 | 2/2008 | Liu et al. |
| 7,424,160 B1 | 9/2008 | Basse |
| 7,496,283 B2 | 2/2009 | Evans et al. |
| 8,023,562 B2 | 9/2011 | Zheludkov et al. |
| 8,054,880 B2 | 11/2011 | Yu et al. |
| 8,073,275 B2 | 12/2011 | Raudnitz |
| 8,180,920 B2 | 5/2012 | Mills et al. |
| 8,249,168 B2 | 8/2012 | Graves |
| 8,270,473 B2 | 9/2012 | Chen et al. |
| 8,311,115 B2 | 11/2012 | Gu et al. |
| 8,331,439 B2 | 12/2012 | Sedeffow |
| 8,351,498 B2 | 1/2013 | Sedeffow |
| 8,363,715 B2 | 1/2013 | Sedeffow |
| 8,588,296 B2 | 11/2013 | Ding et al. |
| 8,724,691 B2 | 5/2014 | Sedeffow |
| 9,350,990 B2 | 5/2016 | Orton-Jay et al. |
| 9,357,210 B2 | 5/2016 | Orton-Jay et al. |
| 9,532,080 B2 | 12/2016 | Zurpal et al. |
| 10,178,399 B2 | 1/2019 | Orton-Jay et al. |
| 2002/0054636 A1 | 5/2002 | Yoneyama |
| 2002/0085638 A1 | 7/2002 | Morad et al. |
| 2002/0097750 A1 | 7/2002 | Gunaseelan et al. |
| 2002/0136296 A1 | 9/2002 | Stone et al. |
| 2002/0169823 A1 | 11/2002 | Coulombe |
| 2003/0002743 A1 | 1/2003 | Ohta |
| 2003/0007558 A1 | 1/2003 | Vetro et al. |
| 2003/0012275 A1 | 1/2003 | Boice et al. |
| 2003/0031371 A1 | 2/2003 | Kato et al. |
| 2003/0043905 A1 | 3/2003 | Nakayama et al. |
| 2003/0067981 A1 | 4/2003 | Zhao |
| 2003/0086597 A1 | 5/2003 | Ohta et al. |
| 2003/0228063 A1 | 12/2003 | Nakayama et al. |
| 2004/0165783 A1 | 8/2004 | Reynolds et al. |
| 2004/0255139 A1 | 12/2004 | Giobbi |
| 2005/0009519 A1 | 1/2005 | Murai et al. |
| 2005/0166245 A1 | 7/2005 | Shin |
| 2005/0251835 A1 | 11/2005 | Scott et al. |
| 2005/0278794 A1 | 12/2005 | Leinonen |
| 2006/0045020 A1 | 3/2006 | Picco et al. |
| 2006/0056508 A1 | 3/2006 | Lafon et al. |
| 2006/0078050 A1 | 4/2006 | Chen |
| 2006/0095942 A1 | 5/2006 | van |
| 2006/0095944 A1 | 5/2006 | Demircin et al. |
| 2006/0126728 A1 | 6/2006 | Yu et al. |
| 2006/0126948 A1 | 6/2006 | Fukuhara et al. |
| 2006/0154648 A1 | 7/2006 | Oh et al. |
| 2006/0165381 A1 | 7/2006 | Eckleder |
| 2006/0190410 A1 | 8/2006 | Harper |
| 2006/0198392 A1 | 9/2006 | Park |
| 2006/0268933 A1 | 11/2006 | Kellerer et al. |
| 2007/0002946 A1 | 1/2007 | Bouton et al. |
| 2007/0053444 A1 | 3/2007 | Shibata et al. |
| 2007/0074266 A1 | 3/2007 | Raveendran et al. |
| 2007/0086528 A1 | 4/2007 | Mauchly et al. |
| 2007/0086680 A1 | 4/2007 | Lim |
| 2007/0094691 A1 | 4/2007 | Gazdzinski |
| 2007/0098162 A1 | 5/2007 | Shin |
| 2007/0103484 A1 | 5/2007 | Hougui et al. |
| 2007/0153914 A1 | 7/2007 | Hannuksela et al. |
| 2007/0230586 A1 | 10/2007 | Shen et al. |
| 2007/0271106 A1 | 11/2007 | Lee et al. |
| 2007/0283269 A1 | 12/2007 | Obrador et al. |
| 2008/0037880 A1 | 2/2008 | Lai |
| 2008/0043831 A1 * | 2/2008 | Sethuraman .......... G10L 19/173 375/240 |
| 2008/0063051 A1 | 3/2008 | Kwon et al. |
| 2008/0084925 A1 | 4/2008 | Rozen et al. |
| 2008/0112483 A1 | 5/2008 | Lu et al. |
| 2008/0120676 A1 | 5/2008 | Morad et al. |
| 2008/0137736 A1 | 6/2008 | Richardson et al. |
| 2008/0192820 A1 | 8/2008 | Brooks et al. |
| 2008/0196076 A1 | 8/2008 | Shatz et al. |
| 2008/0273591 A1 | 11/2008 | Brooks et al. |
| 2008/0273593 A1 | 11/2008 | Sedeffow |
| 2008/0273594 A1 | 11/2008 | Sedeffow |
| 2008/0313680 A1 | 12/2008 | Suzanne |
| 2009/0003432 A1 | 1/2009 | Liu et al. |
| 2009/0016433 A1 | 1/2009 | Henocq et al. |
| 2009/0028428 A1 | 1/2009 | Dovstam et al. |
| 2009/0060033 A1 | 3/2009 | Kimmich et al. |
| 2009/0067489 A1 | 3/2009 | Jacobs |
| 2009/0067491 A1 | 3/2009 | Sun et al. |
| 2009/0086814 A1 | 4/2009 | Leontaris et al. |
| 2009/0086816 A1 | 4/2009 | Leontaris |
| 2009/0110070 A1 | 4/2009 | Takahashi et al. |
| 2009/0132721 A1 | 5/2009 | Soroushian et al. |
| 2009/0168880 A1 | 7/2009 | Jeon et al. |
| 2010/0020878 A1 | 1/2010 | Liang et al. |
| 2010/0034257 A1 | 2/2010 | Sedeffow |
| 2010/0061448 A1 | 3/2010 | Zhou |
| 2010/0070773 A1 | 3/2010 | Tanaka et al. |
| 2010/0111192 A1 | 5/2010 | Graves |
| 2010/0124274 A1 | 5/2010 | Cheok et al. |
| 2010/0189179 A1 | 7/2010 | Gu et al. |
| 2010/0189183 A1 | 7/2010 | Gu et al. |
| 2010/0195713 A1 | 8/2010 | Coulombe et al. |
| 2010/0266009 A1 | 10/2010 | Sedeffow |
| 2010/0316126 A1 | 12/2010 | Chen et al. |
| 2010/0322302 A1 * | 12/2010 | Rodriguez ........... H04N 21/631 375/240.01 |
| 2011/0090950 A1 | 4/2011 | Bush et al. |
| 2011/0090960 A1 | 4/2011 | Leontaris et al. |
| 2011/0129202 A1 | 6/2011 | Soroushian |
| 2011/0170790 A1 | 7/2011 | Cheon et al. |
| 2011/0255555 A1 * | 10/2011 | Alexander ....... H04N 21/23805 370/468 |
| 2011/0268178 A1 | 11/2011 | Park et al. |
| 2011/0305273 A1 | 12/2011 | He et al. |
| 2011/0310216 A1 | 12/2011 | Lee et al. |
| 2012/0017249 A1 | 1/2012 | Ozawa |
| 2012/0173751 A1 | 7/2012 | Braness et al. |
| 2012/0177101 A1 | 7/2012 | van der Schaar |
| 2012/0307883 A1 | 12/2012 | Graves |
| 2013/0031206 A1 | 1/2013 | Miyazaki et al. |
| 2013/0034166 A1 | 2/2013 | Shiodera et al. |
| 2013/0044821 A1 | 2/2013 | Braness et al. |

(56) References Cited

U.S. PATENT DOCUMENTS

| | | | |
|---|---|---|---|
| 2013/0128970 | A1 | 5/2013 | Yu et al. |
| 2013/0322517 | A1 | 12/2013 | Zurpal et al. |
| 2014/0015922 | A1 | 1/2014 | Zhang |
| 2014/0241420 | A1 | 8/2014 | Orton-Jay et al. |
| 2014/0241421 | A1 | 8/2014 | Orton-Jay et al. |
| 2015/0036758 | A1 | 2/2015 | Sato |
| 2016/0065959 | A1 | 3/2016 | Stobaugh et al. |
| 2016/0249109 | A1 | 8/2016 | Nelson |
| 2016/0261879 | A1 | 9/2016 | Orton-Jay et al. |
| 2016/0335754 | A1 | 11/2016 | Aaron et al. |
| 2016/0360202 | A1 | 12/2016 | Xu et al. |
| 2017/0094279 | A1 | 3/2017 | Piramanayagam et al. |
| 2017/0359580 | A1 | 12/2017 | Su et al. |
| 2018/0276538 | A1 | 9/2018 | Gopalan |
| 2019/0075301 | A1 | 3/2019 | Chou et al. |
| 2019/0132591 | A1 | 5/2019 | Zhang et al. |

FOREIGN PATENT DOCUMENTS

| | | | |
|---|---|---|---|
| CN | 105359511 | A | 2/2016 |
| EP | 1585336 | A1 | 10/2005 |
| EP | 1596594 | A1 | 11/2005 |
| EP | 1626557 | A1 | 2/2006 |
| EP | 1659736 | A2 | 5/2006 |
| EP | 1732333 | A1 | 12/2006 |
| EP | 1770957 | A1 | 4/2007 |
| EP | 1786205 | A1 | 5/2007 |
| EP | 2856751 | A1 | 4/2015 |
| EP | 2962461 | A1 | 1/2016 |
| EP | 3038370 | A1 | 6/2016 |
| JP | 08195956 | | 7/1996 |
| JP | 2001503225 | A | 3/2001 |
| JP | 2002142218 | A | 5/2002 |
| JP | 2003299064 | A | 10/2003 |
| JP | 2004320707 | A | 11/2004 |
| JP | 2005229593 | A | 8/2005 |
| JP | 2005260541 | A | 9/2005 |
| JP | 2005311459 | A | 11/2005 |
| JP | 2006033393 | A | 2/2006 |
| JP | 2009502099 | A | 1/2009 |
| JP | 2010258894 | A | 11/2010 |
| JP | 2010262255 | A | 11/2010 |
| JP | 2011029962 | A | 2/2011 |
| JP | 2013026724 | A | 2/2013 |
| JP | 2015523789 | A | 8/2015 |
| JP | 2016526336 | A | 9/2016 |
| JP | 201763495 | | 3/2017 |
| KR | 20160021141 | A | 2/2016 |
| KR | 101823321 | B1 | 1/2018 |
| WO | 1997004585 | | 2/1997 |
| WO | 9819460 | A1 | 5/1998 |
| WO | 2000018137 | | 3/2000 |
| WO | 2000079801 | | 12/2000 |
| WO | 2005083917 | A1 | 9/2005 |
| WO | 2006077526 | A1 | 7/2006 |
| WO | 2007018669 | A1 | 2/2007 |
| WO | 2007053957 | A1 | 5/2007 |
| WO | 2008108966 | A1 | 9/2008 |
| WO | 2010114092 | A1 | 10/2010 |
| WO | 2012009485 | A1 | 1/2012 |
| WO | 2013181013 | A1 | 12/2013 |
| WO | 2013181013 | A8 | 12/2013 |
| WO | 2014132098 | A1 | 9/2014 |
| WO | 2014190308 | A1 | 11/2014 |
| WO | 2016132148 | A1 | 8/2016 |
| WO | 2017036370 | A1 | 3/2017 |

OTHER PUBLICATIONS

Extended European Search Report for European Application No. 13798009.0, Search completed Jan. 18, 2017, dated Jan. 26, 2017, 16 Pgs.

Extended European Search Report for European Application No. 13876558.1, Search completed Jun. 13, 2017, dated Jun. 20, 2017, 12 Pgs.

International Preliminary Report on Patentability for International Application PCT/IB2013/001122, Report Issued Sep. 1, 2015, dated Sep. 11, 2015, 11 Pgs.

International Preliminary Report on Patentability for International Application PCT/US2013/041874, report completed Dec. 2, 2014, 6 pages.

International Search Report and Written Opinion for International Application PCT/IB2013/001122, Search Completed Oct. 21, 2013, dated Nov. 5, 2013, 12 pages.

International Search Report and Written Opinion for International Application PCT/US2013/041874, Search completed Jul. 16, 2013, dated Jul. 24, 2013, 7 pages.

Partial Supplemental European Search Report for European Application No. 13798009.0, Search completed Aug. 31, 2016, dated Sep. 7, 2016, 6 pages.

International Search Report and Written Opinion for International Application PCT/US14/39425, Report Completed Sep. 15, 2014, dated Oct. 17, 2014, 9 pages.

"H.265—HEVC, High Efficiency Video Coding, A Complete Guide to the Latest Standard in Video Compression", Apr. 13, 2013, Retrieved from https://www.encoding.com/h-265/ on Jun. 6, 2017, 3 pgs.

"MPEG-2 Part 1, ISO/IEC Standard 13818-1", Generic Coding of Moving Pictures and Associated Audio: Systems, Nov. 13, 1994, 161 pgs.

"MPEG-4, Part 14, ISO/IEC 14496-14", Information technology—Coding of audio-visual objects, Nov. 15, 2003, 18 pgs.

Anonymous, "Method for the encoding of a compressed video sequence derived from the same video sequence compressed at a different bit rate without loss of data", ip.com, ip.com No. IPCOM000008165D, May 22, 2002, 9 pages.

Crusty, "The Unofficial XviD Faq", XP002338686, Mar. 4, 2004, Retrieved from http://ronald.vslcatena.nl/docs/Xvid-F AQ-Crusty-04-03-2004.pdf on Jul. 28, 2005, 50 pages.

Jang et al., "An adaptive non-linear motion vector resampling algorithm for down-scaling video transcoding", Proceedings of The 2003 International Conference on Multimedia and Expo, vol. 2, Jul. 6-9, 2003, Baltimore, Maryland, USA, pp. 229-232.

Mitsumura et al., "Analytical study of feedback-based rate control at application layer for video streaming services", Technical study report of the institute of electronics, information and Communication Engineers, vol. 111, No. 468, ISSN: 0913-5685, Mar. 8-9, 2012, pp. 203 to 208.

Senda, Yuzo, "Seamless video service and video transcoder", NEC technical journal, NEC Creative, vol. 51, No. 8, ISSN: 0285-4139, Aug. 25, 1998, pp. 46 to 49.

Westerink et al., "Two-pass MPEG•2 variable-bit-rate encoding", IBM Journal of Research and Development, International Business Machines Corporation, XP002395114, ISSN: 0018-8646, vol. 43, No. 4, Jul. 4, 1999, New York, NY, USA, pp. 471-488.

Extended European Search Report for European Application No. 14800901.2, Search completed Dec. 2, 2016, dated Dec. 13, 2016, 13 Pgs.

International Search Report for International Application PCT/JP2010/056013, Search completed Apr. 20, 2010, dated May 11, 2010, 2 pgs.

Search report for Application GB0709009.5, dated Aug. 31, 2007, 1 pg.

Search report for Application GB0709030.1, dated Aug. 31, 2007, 2 pg.

Search report for Application GB0709030.1, dated Jan. 31, 2008, 2 pg.

Search Report for Application GB0906721.6, dated Jul. 24, 2009, 1 pg.

Anonymous, "Any DVD Converter", Dec. 30, 2009, XP55005595, Retrieved from the Internet: http://web.archive.org/web/20091230041557/http://any-video-converter.com/products/for_dvd/ retrieved on Aug. 25, 2011.

Anonymous, "How to rip DVDs in Windows/Mac using Handbrake", Oct. 3, 2008, Retrieved from the Internet: http://www.my-guides.net/en/content/view/111/26/, retrieved on Aug. 30, 2011.

(56) References Cited

OTHER PUBLICATIONS

Anonymous, "Screenshot—Any DVD Converter", Dec. 30, 2009, XP55005596, Retrieved from the Internet: url:http://web.archive.org/web/20091230070300/http://any-video-converter.com/products/for_dvd/screenshot.php retrieved on Aug. 25, 2011.
Bhat et al., "An architectural approach towards achieving bandwidth efficient content delivery", 2016 Spring Technical Forum Proceedings, 8 pgs.
Chiariotti, "Reinforcement learning algorithms for DASH video streaming", Thesis, University of Padova, Academic year 2014-2015, 91 pgs.
Fernandez Escribano et al., "Video Encoding and Transcoding Using Machine Learning", MDM/KDD '08, Aug. 24, 2008, pp. 53-62.
Haskell et al, "Digital Video: An Introduction to MPEG-2", Chapman and Hall, 1997, pp. 33, 35, 230, 232-233.
Hickson, Ian et al., "HTML5—A vocabulary and associated APIs for HTML and XHTML", Mar. 4, 2010, 1-569.
Hunter, "Machine Learning and AI dominate SMPTE 2017 conference", https://www.thebroadcastbridge.com/content/entry/9902/machine-learning-and-ai-dominate-smpte-2017-conference, 4 pgs.
Knight, Tony, "Metadata & the Supply Chain", Mar. 24, 2011.
Lawson, Bruce, "Accessible HTML5 Video with JavaScripted captions", Jan. 13, 2010.
Oh et al., "Action-Conditional Video Prediction Using Deep Networks in Atari Games", Neural Information Processing Systems, 2015, 9 pgs.
Pieters, Simon, "Everything you need to know about Htmls video and audio", Mar. 3, 2010.
Pilgrim, Mark, "Video on the Web", Nov. 16, 2009.
Sambe et al., Yasuo, "High-speed Distributed Video Transcoding for Multiple Rates and Formats", IEICE Transactions on Information and Systems, vol. E88-D Issue 8, Aug. 2005, pp. 1923-1931, XP-002516536.
Shen et al., Bo, "Caching Strategies in Transcoding-enabled Proxy Systems for Streaming Media Distribution Networks", HP Laboratories Technical Report, HPL-2003-261, Dec. 10, 2003—, pp. 1-11,XP-002293154.
Srivastava et al., "Unsupervised Learning of Video Representations using LSTMs", arXiv:1502.04681, 2015, 12 pgs.
Steck, Chris, "Delivering Total Mobile TV: Combining Streaming and Broadcast for a Complete Mobile Television Solution", Dated Apr. 2006. Rev. 1.0.2,12 pages (emphasizing p. 9).
International Preliminary Report on Patentability for International Application PCT/US2014/039425, Report Issued Nov. 24, 2015, dated Dec. 3, 2015, 6 pgs.
Colah et al., "Understanding LSTM Networks", colah.github.io/posts/2015-08-Understanding-LSTMs/, Aug. 27, 2015, 8 pgs.

\* cited by examiner

SYSTEMS AND METHODS FOR THE REUSE OF ENCODING INFORMATION IN ENCODING ALTERNATIVE STREAMS OF VIDEO DATA

CROSS-REFERENCE TO RELATED APPLICATIONS

The present application is a continuation is a continuation of U.S. patent application Ser. No. 13/485,609 filed May 31, 2012, entitled Systems and Methods for the Reuse of Encoding Information in Encoding Alternative Streams of Video Data, the disclosure of which is incorporated herein by reference in its entirety.

FIELD OF THE INVENTION

The present invention is directed, in general, to systems and methods for adaptive streaming systems and more specifically to systems and methods for reusing encoding information in the encoding of alternative streams of video data.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming, or adaptive streaming, involves detecting the present streaming conditions (e.g. the user's network bandwidth and CPU capacity) in real time and adjusting the quality of the streamed media accordingly. Streaming video over the Internet has become a phenomenon in modern times. Many popular websites, such as YouTube, a service of Google, Inc. of Mountain View, Calif., and WatchESPN, a service of ESPN of Bristol, Conn., utilize streaming video in order to provide video and television programming to consumers via the Internet.

Scalable Video Coding (SVC) is an extension of the H.264/MPEG-4 AVC video compression standard, which is specified by the ITU-T H.264 standard by the International Telecommunication Union Telecommunication Standardization Sector of Geneva, Switzerland. SVC enables the encoding of a video bitstream that additionally contains one or more sub-bitstreams. The sub-bitstreams are derived from the video bitstream by dropping packets of data from the video bitstream, resulting in a sub-bitstream of lower quality and lower bandwidth than the original video bitstream. SVC supports three forms of scaling a video bitstream into sub-bitstreams: temporal scaling, spatial scaling, and quality scaling. Each of these scaling techniques can be used individually or combined depending on the specific video system.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods for reusing encoding information in the encoding of alternative streams of video data in accordance with embodiments of the invention are disclosed. In one embodiment of the invention, encoding multimedia content for use in adaptive streaming systems, includes selecting a first encoding level from a plurality of encoding levels using a media server, determining encoding information for a first stream of video data using the first encoding level and the media server, encoding the first stream of video data using the media server, where the first stream of video data includes a first resolution and a first bitrate, selecting a second encoding level from the plurality of encoding levels using the media server, and encoding a second stream of video data using the encoding information and the media server, where the second stream of video data includes a second resolution and a second bitrate.

In another embodiment of the invention, the first resolution and the second resolution are the same.

In an additional embodiment of the invention, the first bitrate is lower than the second bitrate.

In yet another additional embodiment of the invention, the first bitrate is greater than the second bitrate.

In still another additional embodiment of the invention, the first resolution is lower than the second resolution.

In yet still another additional embodiment of the invention, the first resolution is higher than the second resolution.

In yet another embodiment of the invention, determining encoding information includes determining encoding information selected from the group consisting of estimating motion estimation results, selecting weighted prediction weights, and determining scene changes.

In yet still another embodiment of the invention, encoding multimedia content further includes determining motion estimations for the first stream of video data using the first encoding level and the media server and scaling the determined motion estimation results for the second stream of video data using the second encoding level and the media server.

In yet another additional embodiment of the invention, determining motion estimation includes hierarchical motion estimations using the media server.

In still another additional embodiment of the invention, encoding multimedia content further includes storing the first stream of video data and the second stream of video data in a container file using the media server.

In yet still another additional embodiment of the invention, the container file is a Matroska container file.

In yet another embodiment of the invention, encoding multimedia content further includes storing the first stream of video data and the second stream of video data in separate container files using the media server.

In still another embodiment of the invention, encoding the first stream of video data and encoding the second stream of video data utilizes scalable video coding.

Still another embodiment of the invention includes a media server, including memory configured to store multimedia content, where the multimedia content includes a source video, and a processor, wherein the processor is configured by a media encoder application to select a first encoding level from a plurality of encoding levels, determine encoding information for a first stream of video data using the first encoding level, encode the first stream of video data, where the first stream of video data includes a first resolution and a first bitrate, select a second encoding level from the plurality of encoding levels, and encode a second stream of video data using the encoding information, where the second stream of video data includes a second resolution and a second bitrate.

In yet another additional embodiment of the invention, the first resolution and the second resolution are the same.

In still another additional embodiment of the invention, the first bitrate is lower than the second bitrate.

In yet still another additional embodiment of the invention, the first bitrate is greater than the second bitrate.

In yet another embodiment of the invention, the first resolution is lower than the second resolution.

In still another embodiment of the invention, the first resolution is higher than the second resolution.

In yet still another embodiment of the invention, the determined encoding information is selected from the group consisting of emotion estimation results, weighted prediction weights, and scene changes.

In yet another additional embodiment of the invention, the processor is further configured to determine motion estimations for the first stream of video data using the first encoding level and scale the determined motion estimation results for the second stream of video data using the second encoding level.

In still another additional embodiment of the invention, the determined motion estimation includes hierarchical motion estimations.

In yet still another additional embodiment of the invention, the processor is further configured to store the first stream of video data and the second stream of video data in a container file.

In yet another embodiment of the invention, the container file is a Matroska container file.

In still another embodiment of the invention, the processor is further configured to store the first stream of video data and the second stream of video data in separate container files.

In yet still another embodiment of the invention, the first stream of video data and the second stream of video data are encoded using scalable video coding.

Still another embodiment of the invention includes a machine readable medium containing processor instructions, where execution of the instructions by a processor causes the processor to perform a process including selecting a first encoding level from a plurality of encoding levels, determining encoding information for a first stream of video data using the first encoding level, encoding the first stream of video data, where the first stream of video data includes a first resolution and a first bitrate, selecting a second encoding level from the plurality of encoding levels, and encoding a second stream of video data using the encoding information, where second stream of video data includes a second resolution and a second bitrate.

DETAILED DESCRIPTION

Figure 1:
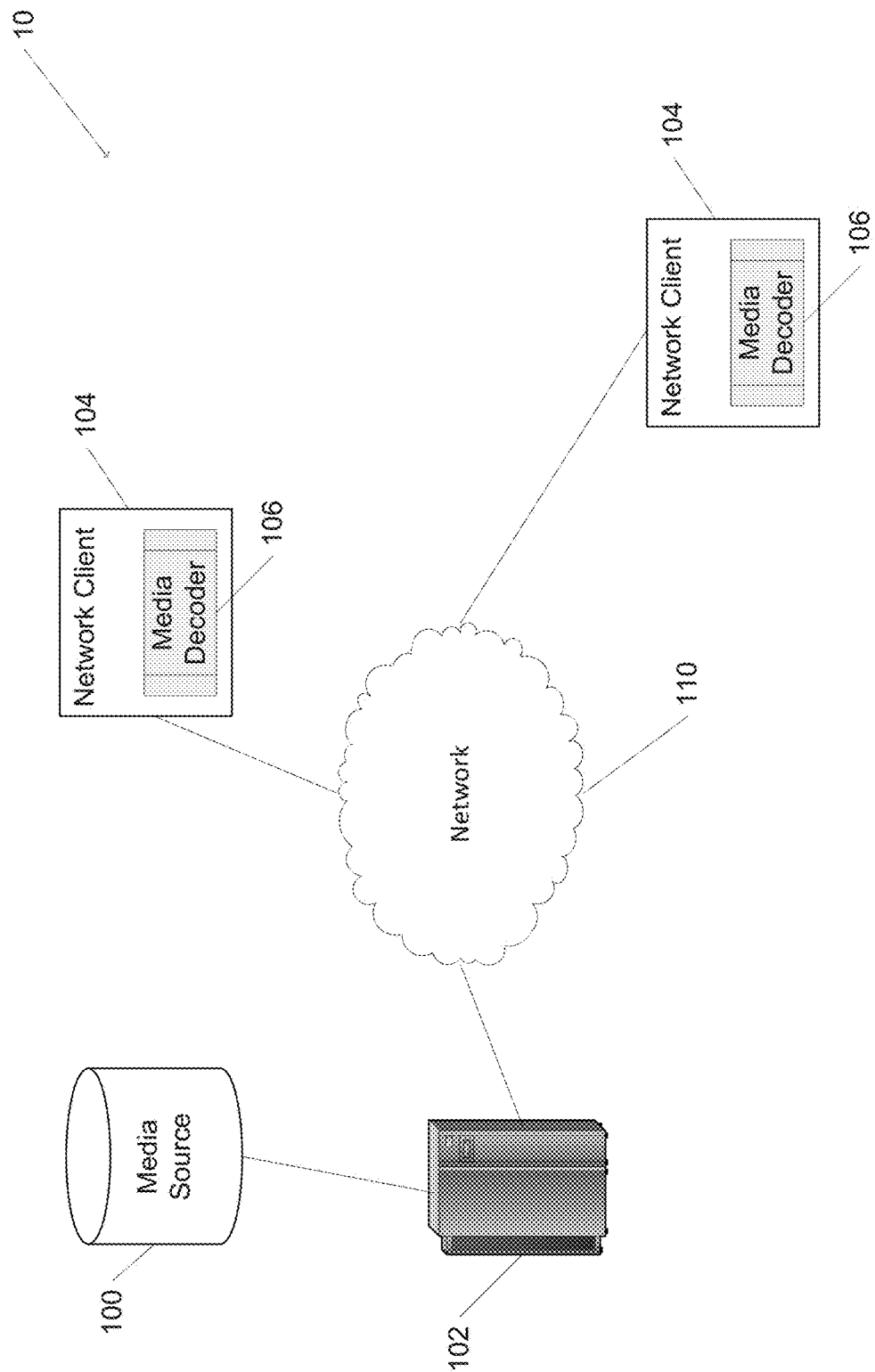
FIG. 1 is a system diagram of an adaptive streaming system in accordance with an embodiment of the invention.

Turning now to the drawings, systems and methods for reusing encoding information in the encoding of alternative streams of video data in accordance with embodiments of the invention are disclosed. Although the present invention is described below with respect to adaptive streaming systems and block-based video encoding techniques, the systems and methods described are equally applicable in conventional streaming systems where different streams of video data are selected based upon a network client's connection quality and video encoding techniques that are not block-based.

In adaptive streaming systems, multimedia content is encoded as a set of alternative streams of video data. Because each alternative stream of video data is encoded using the same source multimedia content, similar encoding information is determined in the encoding of each alternative stream of video data. Encoding information includes, but is not limited to, motion estimation results, the selection of weighted prediction weight(s), and determining scene changes. Systems and methods in accordance with many embodiments of the invention reuse encoding information determined in the encoding of one alternative stream of video data in the encoding of at least one other alternative stream of video data. By reusing encoding information in the encoding of several alternative streams of video data, significant improvements in the encoding of the alternative streams of video data can be achieved, particularly significant time savings may be realized in accordance with embodiments of the invention.

Adaptive streaming systems are configured to stream multimedia content encoded at different maximum bitrates and resolutions over a network, such as the Internet. Adaptive streaming systems stream the highest quality multimedia content, which can be supported based upon current streaming conditions. Multimedia content typically includes video and audio data, subtitles, and other related metadata. In order to provide the highest quality video experience independent of the network data rate, adaptive streaming systems are configured to switch between the available sources of video data throughout the delivery of the video data according to a variety of factors, including, but not limited to, the available network data rate and video decoder performance. When streaming conditions deteriorate, an adaptive streaming system typically attempts to switch to multimedia streams encoded at lower maximum bitrates. In the event that the available network data rate cannot support streaming of the stream encoded at the lowest maximum bitrate, then playback is often disrupted until a sufficient amount of content can be buffered to restart playback. Systems and methods for switching between video streams during playback that may be utilized in adaptive streaming system in accordance with embodiments of the invention are described in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the entirety of which is incorporated by reference.

To create the multiple sources of video data utilized in adaptive streaming systems, a source encoder can be configured to encode a plurality of alternative streams of video data from a source video contained in a piece of multimedia content. Systems and method for encoding a source video for use in adaptive streaming systems are disclosed in U.S. patent application Ser. No. 13/221,794, entitled "Systems and Methods for Encoding Source Media in Matroska Container Files for Adaptive Bitrate Streaming Using Hypertext Transfer Protocol" to Braness et al., filed Aug. 30, 2011, the entirety of which is incorporated by reference. In accordance with embodiments of the invention, a source encoder may be implemented using a media source and/or a media server.

As stated above, alternative streams of video data based on the same source video contain similar content; therefore, encoding information determined in the encoding of one alternative stream of video data for the source video may be reused in the encoding of the one or more of the other alternative streams of video data. In accordance with embodiments of the invention, a set of alternative streams of video data based on the same source video may contain video data at the same resolution but differing bitrates. In many embodiments of the invention, the motion estimation results calculated for the encoding of a particular alternative stream of video data can be reused amongst all the alternative streams of video data. As is discussed below, a variety of encoding information determined in the encoding of alternative streams of video data may be reused amongst the alternative streams of video data. Systems and methods for reusing encoding information in the encoding of alternative streams of video data in accordance with embodiments of the invention are discussed further below.

System Overview

Adaptive streaming systems in accordance with embodiments of the invention are configured to adapt the video transmitted to network clients based on streaming conditions. An adaptive streaming system in accordance with an embodiment of the invention is illustrated in FIG. 1. The illustrated adaptive streaming system 10 includes a media source 100 containing multimedia content. In a number of embodiments of the invention, the multimedia content stored in media source 100 contains a plurality of pre-encoded streams of video data encoded at multiple bitrates and resolutions for adaptive streaming, where the encoding of at least one of the streams of video data in the plurality of streams of video data reuses encoding information determined in the encoding of a second stream of video data. In several embodiments of the invention, the media source 100 encodes a plurality of streams of video data in real time, where the encoding of at least one of the streams of video data in the plurality of streams of video data reuses encoding information determined in the encoding of a second stream of video data. In many embodiments of the invention, the multimedia content stored in media source 100 contains video data encoded utilizing Scalable Video Coding (SVC).

In a number of embodiments, the media source 100 contains multiple streams of video data with equal timelines as alternative streams of video data. The media source 100 is connected to a network renderer 102. In many embodiments, the media source 100 and the network renderer 102 are implemented using a media server. The network renderer 102 is connected to a plurality of network clients 104 via a network 110. The network renderer 102 is configured to stream video data to one or more network clients 104. The network clients 104 each contain a media decoder 106 configured to decode media streamed from the media source 100 using the network renderer 102.

In many embodiments of the invention, the media source 100 and/or the network renderer 102 are implemented using a single machine. In several embodiments of the invention, the media source 100 and/or the network renderer 102 are implemented using a plurality of machines. In many embodiments of the invention, the media source 100 and the network renderer 102 are implemented using a media server. In many embodiments, the network 110 is the Internet. In several embodiments, the network 110 is any IP network. In a number of embodiments, the network 110 is a cellular data network.

Although a specific architecture of an adaptive streaming system is shown in FIG. 1, other implementations appropriate to a specific application can be utilized in accordance with embodiments of the invention. Systems and methods for the reuse of encoding information in the encoding of alternative streams of video data in accordance with embodiments of the invention are discussed further below.

Media Servers Capable of Encoding Media for Adaptive Streaming

Figure 2:
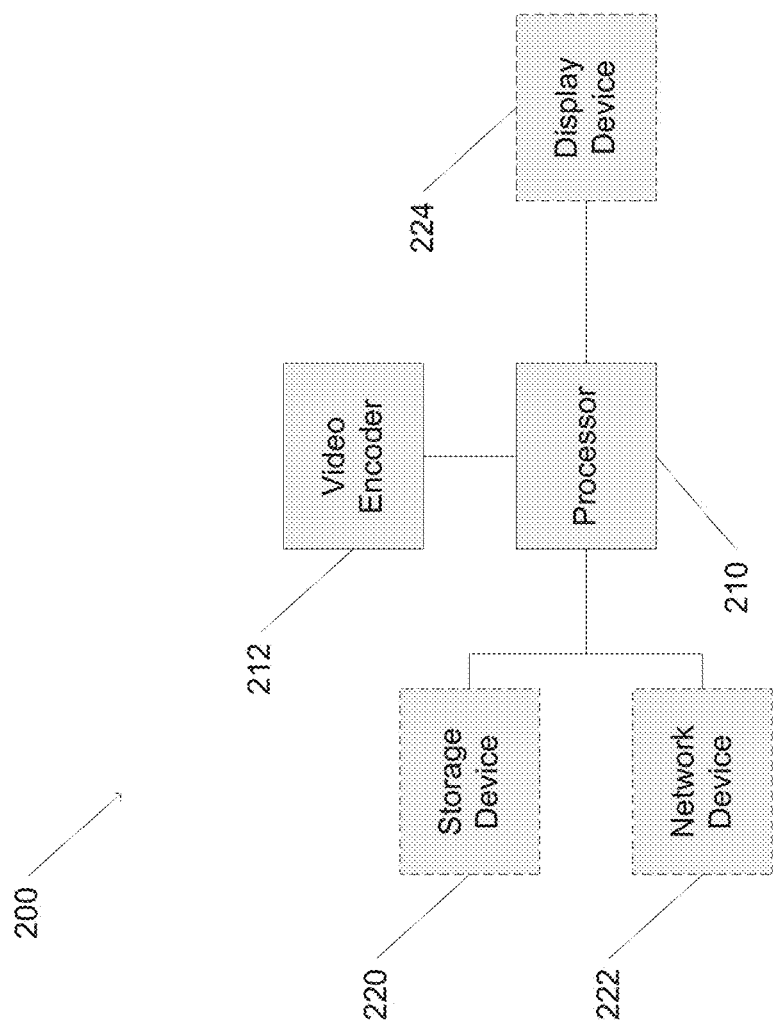
FIG. 2 is a block diagram of a media server configured to encode streams of video data for use in adaptive streaming systems in accordance with an embodiment of the invention.

In accordance with embodiments of the invention, media servers are configured to encode a plurality of alternative streams of video data for a source video contained in multimedia content. FIG. 2 is a block diagram of a media server in accordance with an embodiment of the invention. The media server 200 includes a processor 210 and a video encoder 212. The processor is configured to encode a plurality of streams of video data given a source video. In a number of embodiments, the video encoder 212 is implemented in hardware. In several embodiments, the video encoder 212 is implemented utilizing a graphics processing unit. In many embodiments, the video encoder 212 is a software application, which configures the processor 210 to encode alternative streams of video data.

In a number of embodiments, a media server 200 includes a storage device 220 connected to the processor 210 configured to store multimedia content and/or alternative streams of video data. In many embodiments of the invention, the process 400 encodes the multimedia content using scalable video coding. In several embodiments, the alternative streams of video data are stored in a container utilizing the Matroska container format. In accordance with embodiments of the invention, the alternative streams of video data have an adaptive group of pictures structure.

In a number of embodiments, the media server 200 includes a display device 224 connected to the processor 210, where the display device may be used to display alternative streams of video data and/or information related to the encoding of alternative streams of video data. In accordance with embodiments of the invention, the media server 200 is implemented using one or more servers configured with software applications appropriate to encode and/or stream multimedia content. A media server 200 optionally includes a network device 222 connected to the processor 210. In many embodiments, the network device 222 is configured to establish a network connection and the processor 210 is configured to stream multimedia content using the network connection for use in adaptive streaming systems.

Figure 3:
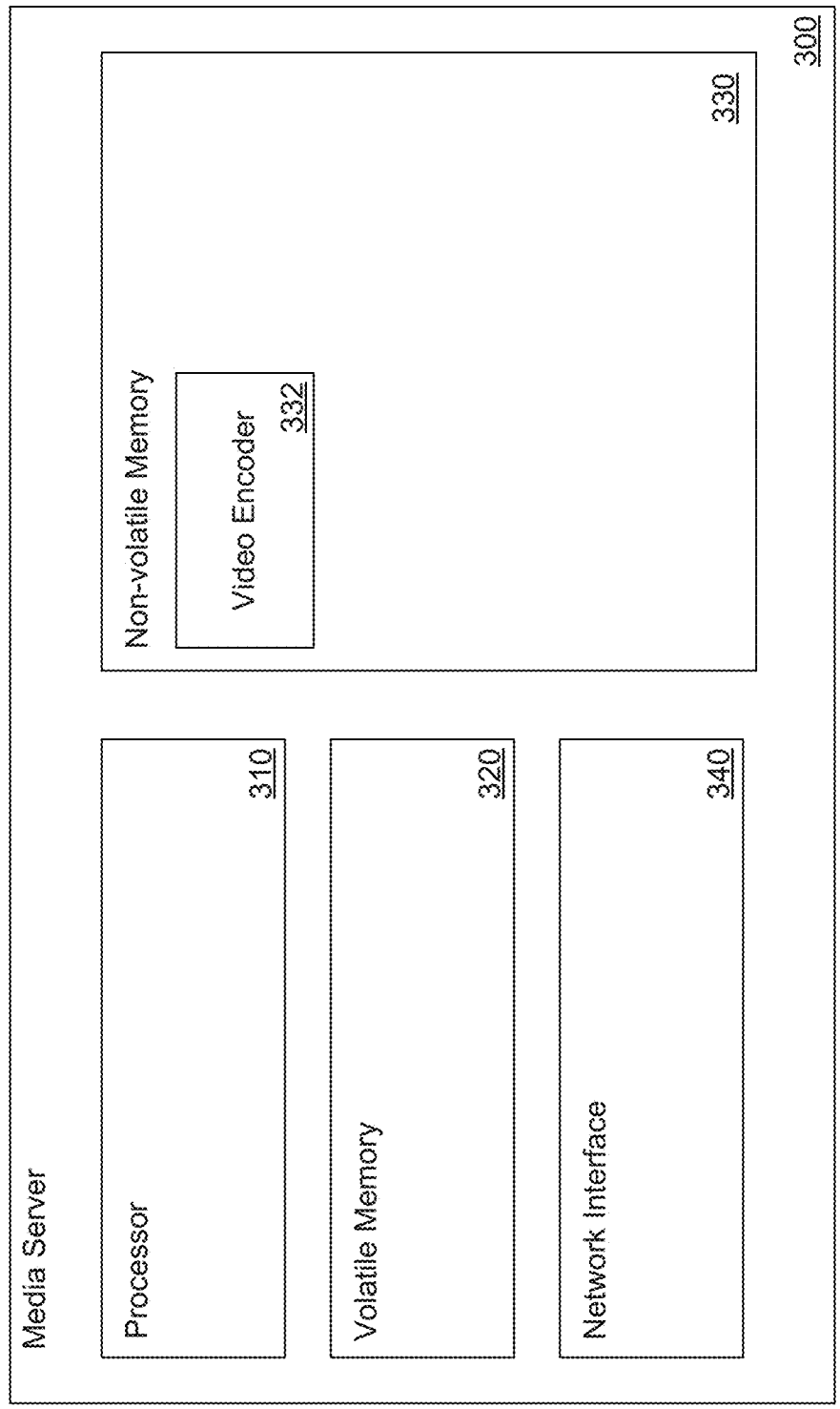
FIG. 3 conceptually illustrates a media server configured to encode streams of video data for use in adaptive streaming systems in accordance with an embodiment of the invention.

The basic architecture of a media server in accordance with an embodiment of the invention is illustrated in FIG. 3. The media server 300 includes a processor 310 in communication with non-volatile memory 330 and volatile memory 320. In the illustrated embodiment, the non-volatile memory includes a video encoder 332 that configures the processor to encode a plurality of alternative streams of video data for a source video, where the encoding of at least one of the alternative streams of video data reuses encoding information determined in the encoding of a second alternative stream of video data. In several embodiments, the video encoder 332 is implemented using the processor 310. The network client 300 also includes a network interface 340 configured to send and receive data over a network connection. In a number of embodiments, the network interface 340 is in communication with the processor 310, the non-volatile memory 330, and the volatile memory 320.

In many embodiments of the invention, the media server 300 includes multiple processors. In a number of embodiments, the video encoder 332 is implemented using dedicated hardware. Although a specific architecture for a media server is illustrated in FIG. 3, any of a variety of architectures including architectures where the video encoder 332 is located on disk or some other form of storage and is loaded into volatile memory 320 at runtime may be utilized to implement media servers for use in adaptive streaming systems in accordance with embodiments of the invention.

Although a specific implementation of a media server is shown in FIG. 2, other implementations appropriate to a specific application can be utilized in accordance with embodiments of the invention. Systems and methods for the reuse of encoding information in the encoding of alternative streams of video data in accordance with embodiments of the invention are discussed further below.

Figure 4:
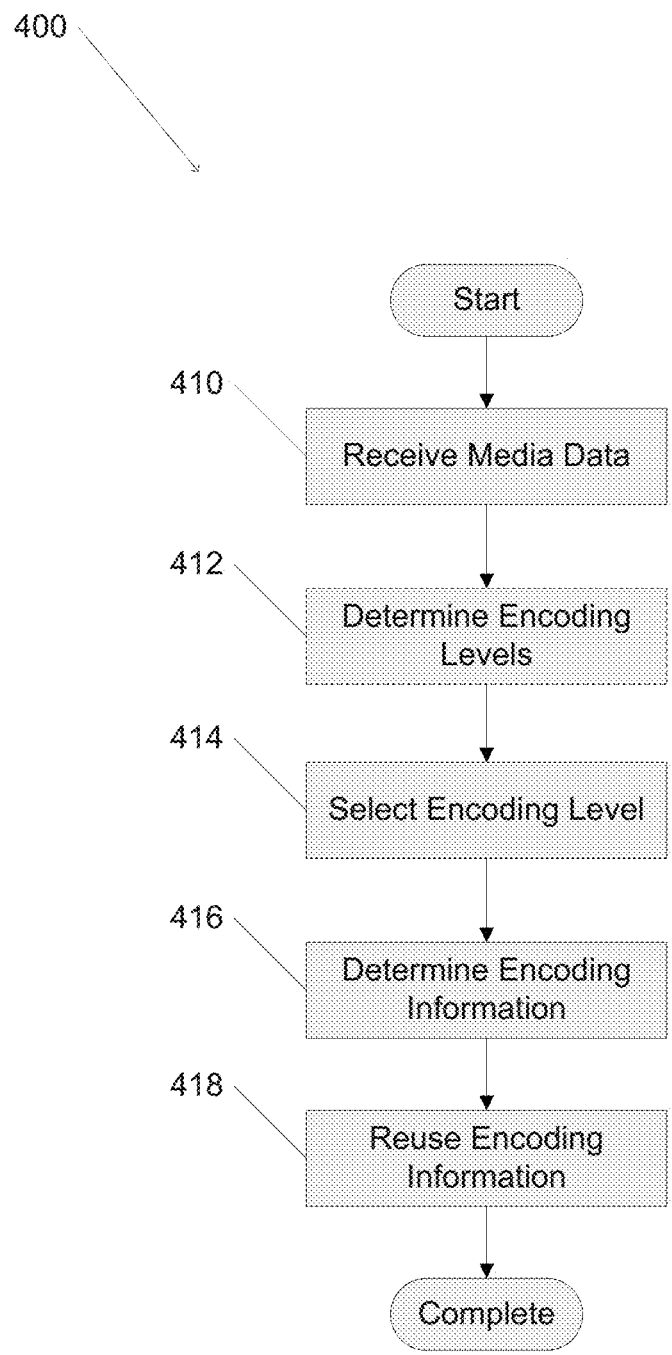
FIG. 4 is a flow chart illustrating a process for reusing encoding information in the encoding of alternative streams of video data in accordance with an embodiment of the invention.

Reusing Encoding Information in the Encoding of Alternative Streams of Video Data In order to provide streams of video data utilized in the adaptive streaming of multimedia content, a media server can encode the multimedia content as alternative streams of video data. The media server can improve the speed and performance of encoding the alternative streams of video data by reusing encoding information determined in the encoding of one stream of video data in the encoding of one or more of the remaining streams of video data. A process for reusing encoding information in the encoding of alternative streams of video data for a source video is illustrated in FIG. 4. The process 400 includes receiving (410) multimedia content containing a source video. In several embodiments, encoding levels are determined (412) for the source video. An encoding level is selected (414). Encoding information is determined (416) for the selected encoding level. The encoding information is reused (418) across one or more of the encoding levels not selected.

In several embodiments, encoding levels are determined (412) based upon factors including, but not limited to, anticipated network data rates, anticipated screen resolutions of network clients, and/or the resolution and/or bitrate of the source video. In a number of embodiments, encoding levels are determined (412) by retrieving stored values. In accordance with embodiments of the invention, an alternative stream of video data having a resolution and bitrate is encoded for each encoding level. In many embodiments, the alternative streams of video data have the same resolution and varying bitrates. In a number of embodiments, the selected (414) encoding level corresponds to the alternative stream of video data with the lowest bitrate. In several embodiments, the selected (414) encoding level corresponds to the alternative stream of video data with the highest bitrate. In a number of embodiments, a variety of determined (416) encoding information may be reused (418) across encoding levels having video data at the same resolution and varying bitrates, including, but not limited to, motion estimation results, the selection of weighted prediction weight(s), and determining scene changes. In accordance with embodiments of the invention, the encoding information can be reused (418) across encoding levels, resulting in a significant savings in computational complexity.

In several embodiments, the alternative streams of video data encoded based on the determined (412) encoding levels have varying resolutions and bitrates. In many embodiments, the selected (414) encoding level corresponds to an alternative stream of video data having the lowest resolution. In a number of embodiments, the selected (414) encoding level corresponds to an alternative stream of video data having the highest resolution. In a number of embodiments, the determined (416) encoding information is reused (418) across streams of video data having different resolutions. In accordance with many embodiments of the invention, the encoding information reused (418) may vary across encoding levels. For example, if the reused (418) encoding information is a motion vector, the motion vector can be scaled relative to the different resolutions of the alternative streams of video data. Other encoding information, such as the information listed above, may likewise be scaled between encoding levels corresponding to alternative streams of video data having different resolutions.

Although a specific process for the reuse of encoding information in the encoding of alternative streams of video data in accordance with an embodiment of the invention is discussed above, a variety of processes, including reusing encoding information not specifically listed and reusing encoding information in alternative streams of video data created at a later time following the initial determination of the encoding information, may be utilized in accordance with embodiments of the invention. A process for reusing motion estimations used in the encoding of alternative streams of video data in accordance with an embodiment of the invention is discussed below.

Reusing Motion Estimations in the Encoding of Alternative Streams of Video Data

A variety of video compression standards, such as H.264, may be utilized to encode alternative streams of video data for use in adaptive streaming systems. Many of the video compression standards utilize frames of video containing macroblocks, and the encoding of the stream of video data involves calculating motion estimations of the macroblocks between frames of video. In accordance with embodiments of the invention, the bitrate of a stream of video data can be varied by allocating the same number of bits to the motion estimations and increasing or decreasing the number of bits assigned to the description of the macroblocks.

Figure 5:
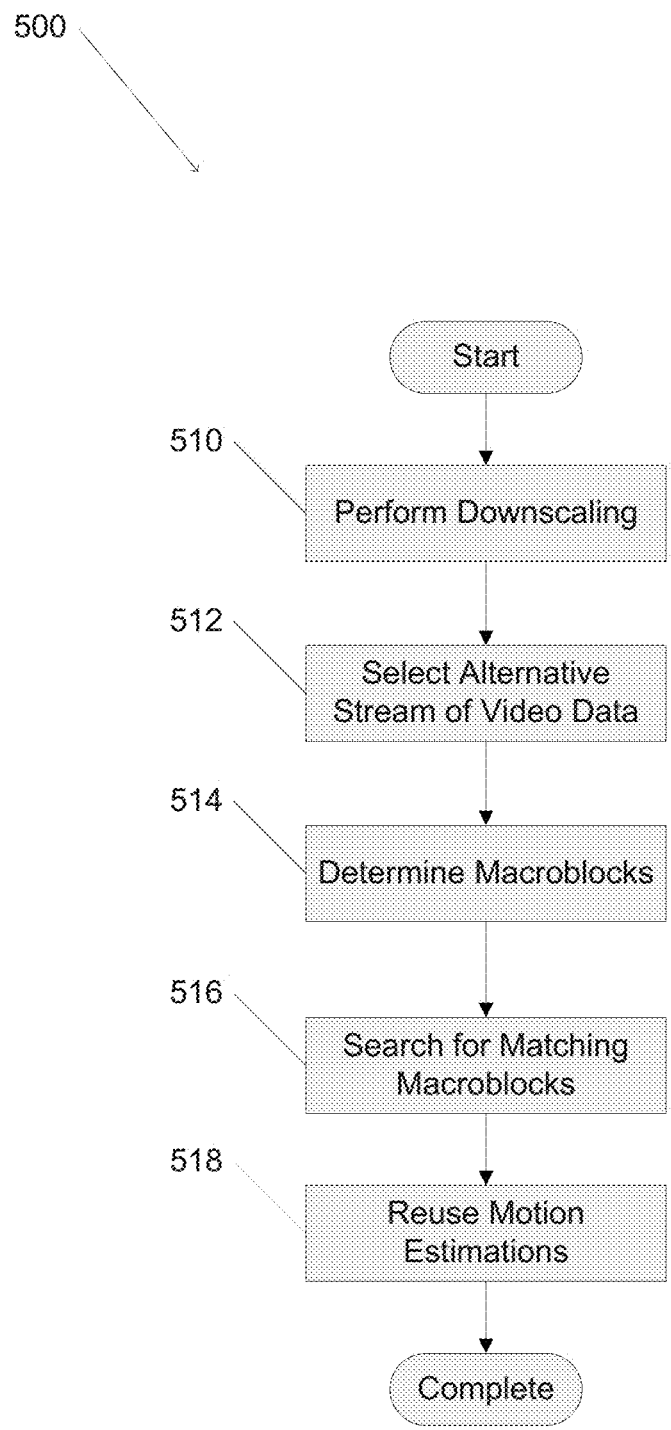
FIG. 5 is a flow chart illustrating a process for reusing motion estimations between encodings of alternative streams of video data having matching macroblocks in accordance with an embodiment of the invention.

A process for reusing motion estimations of the motion of macroblocks between alternative streams of video data derived from the same source video contained in a piece of multimedia content in accordance with an embodiment of the invention is illustrated in FIG. 5. The process 500 includes performing (510) downscaling on the source video to determine the alternative streams of video data. An alternative stream of video data is selected (512). Macroblocks are determined (514) for the selected stream of video data. A search (516) for matching macroblocks in a second alternative stream of video data is performed. If the second alternative stream of video data contains one or more matching macroblocks, the motion estimation results related to the matching macroblocks are reused (518) in the encoding of the second alternative stream of video data.

Figure 6:
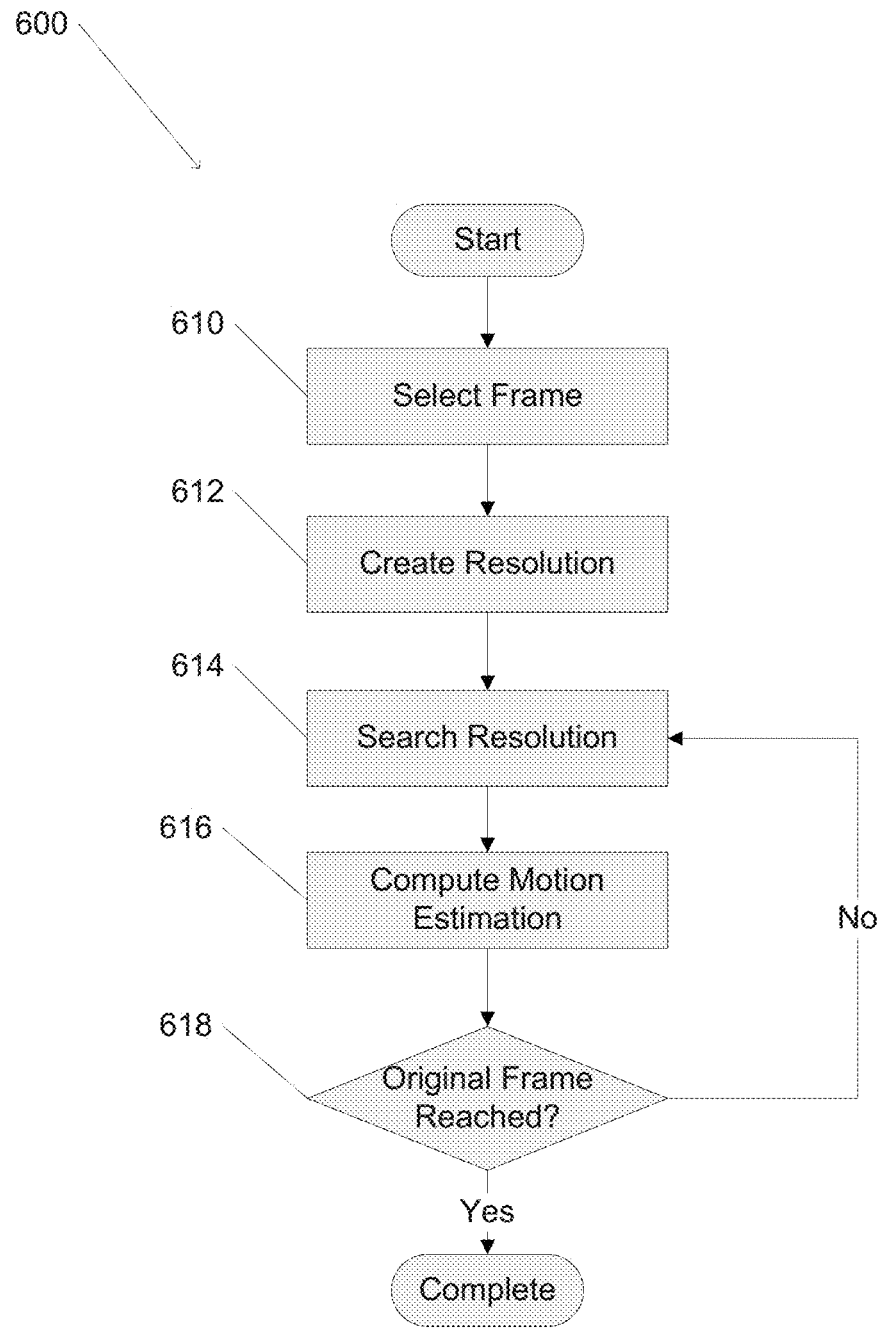
FIG. 6 is a flow chart illustrating a process for performing a hierarchical motion estimation of macroblocks in a frame of video data in accordance with an embodiment of the invention.

Several methods exist for computing estimations of the motion of macroblocks in frames of video data, including, but not limited to, full searches, heuristic searches, and hierarchical estimations. Hierarchical estimations are commonly used because they provide an accurate result in a fast and efficient manner. A process for performing a hierarchical motion estimation of macroblocks in a frame of video data in accordance with an embodiment of the invention is illustrated in FIG. 6. The process 600 includes selecting (610) a frame of video data, which is known as the zero resolution used in the search. Resolutions are created (612) for the selected frame. In accordance with embodiments of the invention, two or more resolutions are created (612), where the created resolutions are smaller than the previous resolution. Resolutions may be created (612) using a variety of image sampling techniques, including, but not limited to, mean intensity and subsampling. The highest resolution is searched (614) for macroblocks corresponding to macroblocks in the zero resolution. The motion estimation is computed (616) for the corresponding macroblock in the highest resolution. If the zero resolution frame has been reached (618), the computed (616) motion estimation is used as the motion estimation for the frame of video data and the process completes. If the zero resolution frame has not been reached (618), the next resolution is searched (614) and the motion estimation is computed (616) utilizing the previously computed (616) motion estimation and the distance the corresponding macroblock has moved between the previous resolution and the current resolution. In a number of embodiments, macroblock motion is computed by a variety of methods, including the mean absolute difference, mean square difference, and pixel difference classification.

Returning to FIG. 5, in several embodiments, searching (516) for matching macroblocks utilizes hierarchical motion estimation. In a number of embodiments, hierarchical motion estimation results, including intermediate results, may be reused (518) between alternative streams of video data having different resolutions. In many embodiments, the selected (512) stream of video data is the alternative stream of video data with the lowest resolution. In a number of embodiments, the selected (512) stream of video data has the highest resolution. In several embodiments, the reused (518) motion estimation results are scaled between alternative streams of video data. A specific process for reusing motion estimations in the encoding of alternative streams of video data is described above; however, a variety of processes for reusing motion estimations may be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. A method for encoding multimedia content for use in adaptive streaming systems, comprising:
   selecting a first encoding level from a plurality of encoding levels using a media server, where the media server comprises a processor and a memory;
   determining encoding information at a video encoder for a first stream of video data using the first encoding level and the media server, where determining encoding information comprises determining motion estimations for the first stream of video data;
   encoding the first stream of video data using the determined motion estimation results and the media server, where the first stream of video data includes a first resolution and a first bitrate;
   selecting a second encoding level from the plurality of encoding levels using the media server; and
   encoding a second stream of video data reusing the encoding information determined for the first stream of video data and using the media server, the second stream of video data being independent from the first stream of video data, wherein:
   reusing the encoding information comprises scaling the determined motion estimation results for the second stream of video data using the second encoding level; and
   the second stream of video data comprises a second resolution and a second bitrate.

2. The method of claim 1, wherein the first resolution and the second resolution are the same.

3. The method of claim 2, wherein the first bitrate is lower than the second bitrate.

4. The method of claim 2, wherein the first bitrate is greater than the second bitrate.

5. The method of claim 1, wherein the first resolution is lower than the second resolution.

6. The method of claim 1, wherein the first resolution is higher than the second resolution.

7. The method of claim 1, wherein determining motion estimation includes hierarchical motion estimations using the media server.

8. The method of claim 1, further comprising storing the first stream of video data and the second stream of video data in a container file using the media server.

9. The method of claim 8, wherein the container file is a Matroska container file.

10. The method of claim 1, further comprising storing the first stream of video data and the second stream of video data in separate container files using the media server.

11. The method of claim 1, wherein encoding the first stream of video data and encoding the second stream of video data utilizes scalable video coding.

12. A media server, comprising:
    memory storing multimedia content comprising a source video; and
    a processor;
    wherein the processor is directed by a media encoder application to:
    select a first encoding level from a plurality of encoding levels;
    determine encoding information at a video encoder for a first stream of video data using the first encoding level, where determining encoding information comprises determining motion estimations for the first stream of video data;

encode the first stream of video data using the determined motion estimation results, where the first stream of video data includes a first resolution and a first bitrate;

select a second encoding level from the plurality of encoding levels; and encode a second stream of video data reusing the encoding information determined for the first stream of video data, the second stream of video data being independent from the first stream of video data;

wherein reusing the encoding information comprises scaling the determined motion estimation results for the second stream of video data using the second encoding level; and wherein the second stream of video data includes a second resolution and a second bitrate.

13. The media server of claim 12, wherein the first resolution and the second resolution are the same.

14. The media server of claim 13, wherein the first bitrate is lower than the second bitrate.

15. The media server of claim 13, wherein the first bitrate is greater than the second bitrate.

16. The media server of claim 12, wherein the first resolution is lower than the second resolution.

17. The media server of claim 12, wherein the first resolution is higher than the second resolution.

* * * * *